United States Patent [19]

Acker et al.

[11] Patent Number: 5,064,702
[45] Date of Patent: Nov. 12, 1991

[54] QUINOXALINEPENTAMETHINE DYES AND OPTICAL RECORDING MEDIUM CONTAINING SAME

[75] Inventors: Michael Acker, Heidelberg; Peter Neumann, Mannheim; Bernhard Albert, Maxdorf; Sibylle Brosius; Klaus D. Schomann, both of Ludwigshafen; Harald Kuppelmaier, Goennheim, all of Fed. Rep. of Germany

[73] Assignee: BASF Aktiengesellschaft, Ludwigshafen, Fed. Rep. of Germany

[21] Appl. No.: 603,552

[22] Filed: Oct. 26, 1990

[30] Foreign Application Priority Data

Oct. 28, 1989 [DE] Fed. Rep. of Germany ....... 3936051

[51] Int. Cl.$^5$ .............................................. B32B 3/02
[52] U.S. Cl. ...................................... 428/64; 428/65; 428/204; 428/206; 428/207; 428/411.1; 428/913; 369/288; 346/76 L; 346/135.1; 430/270; 430/495; 430/945
[58] Field of Search ................... 428/64, 65, 204, 206, 428/207, 411.1, 913; 369/288; 346/76 L, 135.1; 430/270, 495, 945

[56] References Cited

U.S. PATENT DOCUMENTS 4,460,665 7/1984 Kunikane et al. .................. 428/199

FOREIGN PATENT DOCUMENTS 0217245 8/1987 European Pat. Off. .
821396 12/1937 France .
58-112790 7/1983 Japan .
58-125246 7/1983 Japan .

OTHER PUBLICATIONS

CA112(6):38114j, Dimerization Reactions of Cyanine Radical Dictation, Parton et al, 1990.
CA 74(22):113194n, Syntheses with Substituted Malonaldehydes, Reichardt et al, (1971).
CA 73(4): 16252b, Syntheses with Substituted Malonaldehydes, Reichardt et al, (1970).

*Primary Examiner*—Patrick J. Ryan
*Attorney, Agent, or Firm*—Oblon, Spivak, McClelland, Maier & Neustadt

[57] ABSTRACT

Quinoxalinepentamethine dyes of the formula

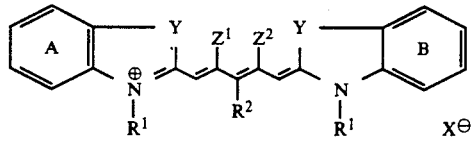

where
$R^1$ is hydrogen, substituted or unsubstituted $C_1$–$C_{22}$-alkyl or substituted or unsubstituted $C_5$–$C_7$-cycloalkyl,
$R^2$ is hydrogen, chlorine, bromine or $C_1$–$C_6$-alkyl,
Y is a radical of the formula —N═C(CH$_3$)— or —N(R$^1$)—CO—, where $R^1$ is as defined above,
$Z^1$ and $Z^2$ are each hydrogen or together are unsubstituted or substituted $C_2$–$C_3$-alkylene,
$X^\ominus$ is an anion and
the rings A and B independently of each other may be substituted and/or benzofused and are useful in optical recording media.

6 Claims, No Drawings

QUINOXALINEPENTAMETHINE DYES AND OPTICAL RECORDING MEDIUM CONTAINING SAME

The present invention relates to novel quinoxalinepentamethine dyes of the formula I

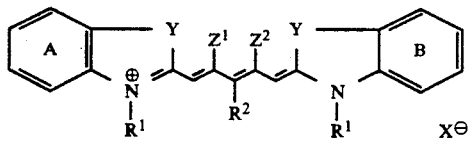

where $R^1$ has identical or different meanings in each appearance, denoting in each case hydrogen, $C_1$–$C_{22}$-alkyl, which may be substituted and interrupted by one or more oxygen atoms, or substituted or unsubstituted $C_5$–$C_7$-cycloalkyl, $R^2$ is hydrogen, chlorine, bromine or $C_1$–$C_6$-alkyl, Y has identical or different meanings in each appearance, denoting in each case a radical of the formula —N=C(CH$_3$)— or —N(R$^1$)—CO—, where $R^1$ is as defined above, $Z^1$ and $Z^2$ are each hydrogen or together are unsubstituted or $C_1$–$C_4$-alkyl-substituted $C_2$–$C_3$-alkylene, $X^\ominus$ is an anion and the rings A and B are identical to or different from each other and independently of each other may be substituted or benzofused, and to an optical recording medium containing same.

Recording media which on being subjected to radiation of high energy density, e.g. laser light, undergo a local change of state are known. This thermally initiated change of state, for example vaporization, alteration of flow characteristics or fading, is associated with a change in the optical properties, for example the absorption through a change in the absorption maximum or the absorbance, which may be utilized for information or data recording.

Suitable light sources for an optical recording medium are for example semiconductor lasers which emit light in the near infrared. Solid state injection lasers, in particular the AlGaAs laser, which operates within the wavelength range of about 650–900 nm, are particularly suitable. For this reason there is particular interest in those recording materials which absorb radiation within the wavelength range of from about 650 to 900 nm and can be made into thin, homogeneous layers.

For instance, JP-A-112 790/1983 and JP-A-125 246/1983 propose methine dyes for this purpose. However, the prior art dyes frequently still have application defects.

It is an object of the present invention to provide new radiation-sensitive products which are strongly reflecting and strongly absorbing in the wavelength range of the semiconductor lasers used. They should also be simple to prepare, have good long-term stability and be readily soluble in polymers. It is a further object of the present invention to provide a new optical recording medium in which the layers containing the novel products should be homogeneous, exhibit firm adhesion to the customary base materials, and be stable over a long period. Such optical recording media should furthermore be suitable and subsequently clearly readable with a semiconductor laser and be notable for a very high signal-to-noise ratio.

We have found that these objects are achieved by the quinoxalinepentamethine dyes of the formula I defined above.

Any alkyl and alkylene appearing in the above-mentioned moieties within the formula I may be either straight-chain or branched.

If the rings A and B in the formula I are substituted, possible substituents are for example $C_1$–$C_{12}$-alkyl, which may be interrupted by one or more, in particular 1, 2 or 3, oxygen atoms, phenyl, hydroxyl, halogen, in particular chlorine or bromine $C_1$–$C_{22}$-alkoxy, $C_1$–$C_{10}$-alkylthio, phenylthio, cyano, amino, $C_1$–$C_{16}$-monoalkylamino, $C_1$–$C_{16}$-dialkylamino, pyrrolidino, piperidino, morpholino, piperazino, N-($C_1$–$C_4$-alkyl)-piperazino and hydroxysulfonyl.

If $R^1$ is substituted $C_1$–$C_{22}$-alkyl, suitable substituents are for example hydroxyl, methacryloyloxy, phenyl, halogen, carboxyl, hydroxysulfonyl $C_1$–$C_4$-alkanoyl, $C_1$–$C_4$-alkanoylamino, $C_1$–$C_4$-alkoxycarbonyl and $C_1$–$C_4$-alkoxycarbonylamino. The alkyl chain may additionally be interrupted by one or more, in particular 1, 2 or 3, oxygen atoms.

If $R^1$ is substituted $C_5$–$C_7$-cycloalkyl, suitable substituents are for example $C_1$–$C_4$-alkyl and halogen (in particular chlorine or bromine).

Suitable $R^1$ and $R^2$ are for example methyl, ethyl, propyl, isopropyl, butyl, isobutyl, sec-butyl and tert-butyl.

$R^1$ may also be for example pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl, eicosyl, heneicosyl, docosyl (the names isooctyl, isononyl, isodecyl and isotridecyl are trivial names derived from the oxo process alcohols [cf. Ullmanns Encyklopädie der technischen Chemie, 4th edition, volume 7, pages 215-217, and volume 11, pages 435 and 436]), benzyl, 1- or 2-phenylethyl, fluoromethyl, chloromethyl, bromomethyl, difluoromethyl, trifluoromethyl, trichloromethyl, 2-fluoroethyl, 2-chloroethyl,2-bromoethyl, 1,1-difluoroethyl, 1,1,1-trifluoroethyl, heptafluoropropyl, 4-chlorobutyl, 4-bromobutyl, 5-fluoropentyl, 6-chlorohexyl, 2-methoxyethyl, 2-ethoxyethyl, 2-propoxyethyl, 2-isopropoxyethyl, 2-butoxyethyl, 2-benzyloxyethyl, 2- or 3-methoxypropyl, 2- or 3-ethoxypropyl, 2- or 3-benzyloxypropyl, 2- or 4-ethoxybutyl, 2- or 4-isopropoxybutyl, 5-ethoxypentyl, 6-methoxyhexyl, 3,6-dioxaheptyl, 3,6-dioxaoctyl, 3,6-dioxadecyl, 3,6,9-trioxadecyl, 4-oxa-6-ethyldecyl, 3,6-dioxa-7-phenylheptyl, propan-2-on-1-yl, butan-3-on-1-yl, butan-3-on-2-yl, 2-ethylpentan-3-on-1-yl, carboxymethyl, 2-carboxyethyl, 3-carboxypropyl, 4-carboxybutyl, 5-carboxypentyl, 4-carboxy-3-oxabutyl, acetylaminomethyl, 2-acetylaminoethyl, 2-propionylaminoethyl, 2-butyrylaminoethyl, ethoxycarbonylmethyl, 2-ethoxycarbonylethyl, 2- or 3-methoxycarbonylpropyl, ethoxycarbonylaminomethyl, 2-(ethoxycarbonylamino)ethyl, 2-hydroxyethyl, 2-hydroxypropyl, 3-hydroxypropyl, 2-hydroxybutyl, 4-hydroxybutyl, 5-hydroxypentyl, 6-hydroxyhexyl, 7-hydroxyheptyl, 8-hydroxyoctyl, 2-methacryloyloxyethyl, 2- or 3-methacryloyloxypropyl, 2- or 4-methacryloyloxybutyl, 2-hydroxysulfonylethyl, 2- or 3-hydroxysulfonylpropyl, 2- or 4-hydroxysulfonylbutyl, cyclopentyl, cyclohexyl, cycloheptyl, 3- methylcyclopentyl, 4-methylcyclohexyl, 4-ethylcyclohexyl or 2,3-dichlorocyclohexyl.

$Z^1$ and $Z^2$ together are for example —$(CH_2)_2$—, —$(CH_2)_3$—, —$CH(CH_3)$—$CH_2$—, —$CH(C_2H_5)$—$CH_2$—, —$CH_2$—$CH(CH_3)$—$CH_2$— or —$CH_2$—$CH(C_2H_5)$—$CH_2$—.

$X^\ominus$ in the formula I is an anion. Both inorganic and organic anions are possible. Examples of suitable anions are halide, such as chloride, bromide or iodide, sulfate, perchlorate, phosphate, tetrafluoroborate, trichlorozincate, methylsulfonate, phenylsulfonate, 4-methylphenylsulfonate, methosulfate, ethosulfate, acetate, lactate, salicylate and tetraphenylboranate. The present invention also embraces those dyes of the formula I with a betaine structure, i.e. where the anionic group is part of the dye molecule.

$X^\ominus$ may also be for example an anion of a heteropolyacid based on tungsten and/or molybdenum together with phosphorus, silicon, vanadium, cobalt, aluminum, manganese, chromium and/or nickel. It is also possible to use for example the copper(I)-hexacyanoferrate(II) anion.

The preparation of these heteropolyacids and of their salts is known. The acids are obtained by acidifying solutions of the tungstates, molybdates and/or vanadates in the form of the alkali metal and/or ammonium salts in the presence of phosphate and/or water-soluble silicates. Here the choice of weight ratio of tungstate, molybdate and vanadate and also of phosphate and silicate determines the compositions of the various heteropolyacids. Examples of heteropolyacids are:

phosphomolybdic acid, silicomolybdic acid, phosphotungstic acid, silicotungstic acid, phosphovanadic acid, silicovanadic acid, phosphotungsticmolybdic acid, silicotungsticmolybdic acid, phospho- or silico-tungsticvanadic acid or phosphosilicotungsticmolybdic acid, which may additionally contain built-in vanadium.

Preference is given to those quinoxalinepentamethine dyes of the formula I where $R^1$ is hydrogen or $C_1$-$C_{22}$-alkyl, $C_1$-$C_{22}$-bromoalkyl, $C_1$-$C_{12}$-hydroxyalkyl, $C_1$-$C_{12}$-methacryloxyloxyalkyl, $C_1$-$C_{12}$-hydroxysulfonylalkyl, $C_1$-$C_6$-carboxyalkyl or ($C_1$-$C_4$-alkoxycarbonyl)-$C_1$-$C_6$-alkyl, which may each be interrupted by from 1 to 3 oxygen atoms, $R^2$ is hydrogen, chlorine, bromine or $C_1$-$C_4$-alkyl, $Z^1$ and $Z^2$ are each hydrogen or together are unsubstituted or $C_1$-$C_4$-alkyl-substituted $C_2$-$C_3$-alkylene, and the rings A and B may each be amino-, chlorine-, bromine-, hydroxysulfonyl- or $C_1$-$C_6$-alkyl-substituted and/or benzofused.

Particular preference is given to those quinoxalinepentamethine dyes of the formula I where $R^1$ is $C_1$-$C_{12}$-alkyl $C_1$-$C_{12}$-bromoalkyl, $C_1$-$C_{12}$-hydroxysulfonylalkyl or ($C_1$-$C_4$-alkoxycarbonyl)-$C_1$-$C_6$-alkyl, which may each be interrupted by from 1 to 3 oxygen atoms, $R^2$ is hydrogen, chlorine, bromine or $C_1$-$C_3$-alkyl, $Z^1$ and $Z^2$ are each hydrogen, and the rings A and B are unsubstituted.

Preferred anions $X^\ominus$ are chloride, bromide, iodide, perchlorate, tetrafluoroborate, 4-methylphenylsulfonate, methylsulfonate, methosulfate, tetraphenylboranate and salicylate.

The dyes according to the present invention are prepared in a conventional manner, for example by condensation of cyclammonium compounds of the formula II or III

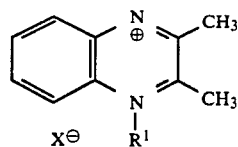

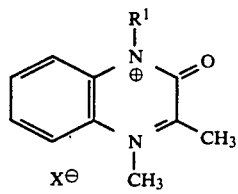

where R and $X^\ominus$ are each as defined above, or starting from a quinoxaline of the formula IV

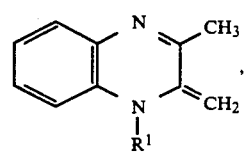

where $R^1$ is as defined above, with components of the formula V, VI, VII or VIII

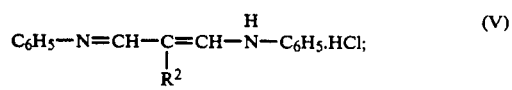

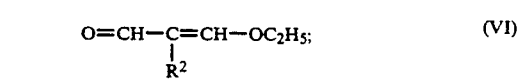

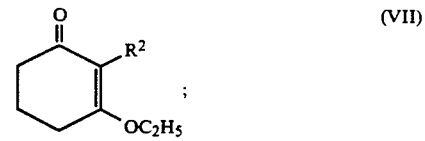

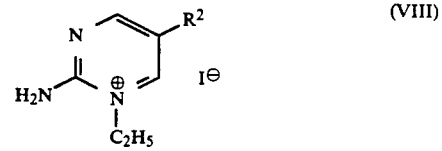

where $R^2$ is in each case as defined above, in an inert solvent at 20°–140° C. in the presence or absence of a base catalyst.

Suitable inert solvents for the reactions are for example ethanol, acetic anhydride, pyridine, glacial acetic acid and compatible mixtures thereof. Suitable bases are for example triethylamine and piperidine.

Further details of the preparation may be found in the Examples.

The starting compounds of the formulae II to VIII are essentially compounds known per se.

The novel quinoxalinepentamethine dyes of the formula I have a high molar absorption within the range from 750 to 800 nm. They are also readily soluble in organic solvents and also in thermoplastics and crosslinked plastics.

The present invention further provides an optical recording medium comprising a base and a dye-containing layer which is sensitive to laser light, wherein the dye is a quinoxalinepentamethine dye of the formula I

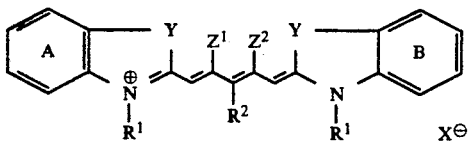

where
$R^1$ has identical or different meanings in each appearance, denoting in each case hydrogen, $C_1-C_{22}$-alkyl, which may be substituted and interrupted by one or more oxygen atoms, or substituted or unsubstituted $C_5-C_7$-cycloalkyl, $R^2$ is hydrogen, chlorine, bromine or $C_1-C_6$-alkyl, Y has identical or different meanings in each appearance, denoting in each case a radical of the formula $-N=C(CH_3)-$ or $-N(R^1)-CO-$, where $R^1$ is as defined above, $Z^1$ and $Z^2$ are each hydrogen or together are unsubstituted or $C_1-C_4$-alkyl-substituted $C_2-C_3$-alkylene, $X^\ominus$ is an anion and the rings A and B are identical to or different from each other and independently of each other may be substituted or benzofused.

Preference is given to an optical recording medium which contains a quinoxalinepentamethine dye of the formula I where $R^1$ is hydrogen or $C_1-C_{22}$-alkyl, $C_1-C_{22}$-bromoalkyl, $C_1-C_{12}$-hydroxyalkyl, $C_1-C_{12}$-methacryloyloxyalkyl, $C_1-C_{12}$-hydroxysulfonylalkyl, $C_1-C_6$-carboxyalkyl or $(C_1-C_4$-alkoxycarbonyl$)-C_1-C_6$-alkyl, which may each be interrupted by from 1 to 3 oxygen atoms, $R^2$ is hydrogen, chlorine, bromine or $C_1-C_4$-alkyl, $Z^1$ and $Z^2$ are each hydrogen or together are unsubstituted or $C_1-C_4$-alkyl-substituted $C_2-C_3$-alkylene, and the rings A and B may each be amino-, chlorine-, bromine-, hydroxysulfonyl- or $C_1-C_6$-alkyl-substituted and/or benzofused.

Particular preference is given to an optical recording medium which contains a quinoxalinepentamethine dye of the formula I where $R^1$ is $C_1-C_{12}$-alkyl, $C_1-C_{12}$-bromoalkyl, $C_1-C_{12}$-hydroxysulfonylalkyl or $(C_1-C_4$-alkoxycarbonyl$)-C_1-C_6$-alkyl, which may each be interrupted by from 1 to 3 oxygen atoms, $R^2$ is hydrogen, chlorine, bromine or $C_1-C_3$-alkyl, $Z^1$ and $Z^2$ are each hydrogen, and the rings A and B are identical and unsubstituted.

Suitable base materials are for example glass plates or disks or plastics plates or disks, in particular plates or disks made of polymethyl methacrylate, polystyrene, polystyrene copolymers, polyvinyl chloride, polymethylpentene or polycarbonate, which may be grooved.

These base materials may take the form of a tape, a square or rectangular plate or preferably a round disk, preference being given to the disks 10 or 13 cm in diameter which are conventional for laser-optical recording elements.

The recording medium according to the present invention can be free of binders. Preferably, however, the recording medium does contain a binder. Suitable binders are for example silicone resins, epoxy resins, acrylate resins, polystyrene homopolymers and copolymers, polyvinylcarbazole, polyvinylpyrrolidone, polyvinyl ester copolymers, polyvinylidene chloride copolymers and polyvinyl chloride.

There may be a reflecting layer between the light-absorbing layer and the base material, so that the portion of incident light which has not been absorbed in the course of its passage through the colored layer is reflected at the reflector layer and passes once more through the colored layer.

The base or substrate can also be transparent. A possible layer sequence is then substrate/absorber layer/optionally a reflector layer.

Suitable light-reflecting materials are for example aluminum, rhodium, gold, tin, lead, bismuth, copper and dielectric mirrors. The light-reflecting layer should ideally be sufficiently thick as to reflect all the recording or scanning light.

It is advantageous for this purpose to use mirrors of low thermal conductivity. The base and the light-reflecting layer must have an optically smooth, planar surface and be constructed at the surface in such a way that the absorbing layer is firmly adherent thereto. To influence the surface quality and adhesion phenomena in a favorable direction, the base and/or the reflector can be provided with a planarizing layer of a thermosetting or thermoplastic material.

If the optical recording medium has a metallic reflector, said reflector is preferably applied in a conventional manner, for example by vapor deposition in a vacuum or else by applying suitable metal foils to the base.

The recording medium according to the present invention is applied to a base by spin coating with a solution containing a dye of the formula I, with or without a polymeric binder and a solvent, and the applied layer or film is dried in air. It can also be dried under reduced pressure, at elevated temperature or, where appropriate, with radiation.

Suitable solvents are for example are 1,1,2-trichloroethane, methyl ethyl ketone, diacetone alcohol, toluene, methanol, ethanol, propanol and mixtures thereof.

The spin coating solution may contain additives, such as antioxidants, singlet oxygen quenchers or UV absorbers.

It is also possible to cover the dye-in-polymer layer with a protective layer. Suitable for this purpose are a number of polymers which, on application by spin coating, knife coating, dipping (from solution) or vacuum vapor deposition (in particular in the case of fluorinated polymers) are capable of forming a protective layer.

If the recording system is constructed from two identical or different recording media in the form of a sandwich, it is in general possible to dispense with a protective layer. In addition to greater mechanical and rotation-dynamical stability, the sandwich structure offers the advantage of doubled storage capacity.

The protective and/or intermediate layer can usually be dispensed with if the optical recording medium is of sufficient quality. If, however, it is not possible to dispense with an intermediate layer, its thickness must be chosen in such a way, but bearing in mind the refractive index of its material and the wavelength of the laser light used, as to rule out troublesome interference.

The optical recording medium according to the present invention is strongly absorbing at the wavelength of commercial semiconductor lasers (about 650-900 nm). The dye-in-polymer systems can be applied to a light-reflecting layer in such a way as to produce smooth, homogeneous absorption layers of high optical quality which possess a favorable threshold energy and into which the information to be stored can be written in the form of pits with an excellent signal-to-noise ratio.

The recording media according to the present invention are writable and readable with a semiconductor laser. Recording media according to the present invention are very stable to atmospheric effects and daylight.

Owing to the high absorbance of the quinoxalinepentamethine dyes of the formula I, the novel recording media are very sensitive to light from solid state injection lasers which emit in the near infrared. A particularly noteworthy laser of this type is the AlGaAs laser, which emits within the wavelength range from 750 to 950 nm. Owing to its small size, its low energy consumption and the option of direct modulation of the optical output through modulation of the electrical drive current, this type of laser is particularly highly suitable.

The Examples which follow will illustrate the present invention.

A) Preparation of Dyes

EXAMPLE 1

9.1 g (33 mmol) of N-(n-dodecyl)-o-phenylenediamine were added at room temperature with stirring to 2.85 g (33 mmol) of biacetyl in 60 ml of acetic anhydride, and the mixture was stirred at room temperature for 15 minutes. 3.6 g (15 mmol) of 3-methylmalondialdehydebisanil were then added, and the mixture was stirred at room temperature for a further 5 hours. 2.25 g (15 mmol) of sodium iodide were then added, the mixture was stirred for a further 2 hours, and the precipitated solids were then filtered off. The filter residue was washed with a little acetic anhydride and ether and dried under reduced pressure, leaving a dye of the formula

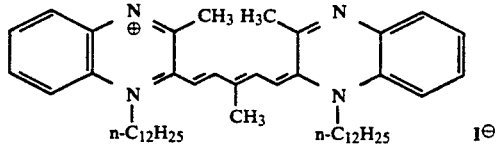

Yield: 1.82 g (13% of theory); melting point: 135°–136° C.; λmax=795 nm (in $CH_2Cl_2$).

EXAMPLE 2

2.1 g (17 mmol) of dimethylsulfate were added to 5.0 g (21 mmol) of 2-methyl-4-(4-oxapentyl)quinoxal-3-one, and the mixture was heated at 150° C. for 15 minutes. After cooling, 10 ml of acetic anhydride and 7 ml of pyridine were added, followed by 2.3 g (7.5 mmol) of the hydrobromide of the bisanil of mucobromic acid. The reaction mixture was stirred at room temperature for 60 minutes. The precipitated solids were filtered off with suction and then washed repeatedly first with a little acetic anhydride and then with ether. Drying left a dye of the formula

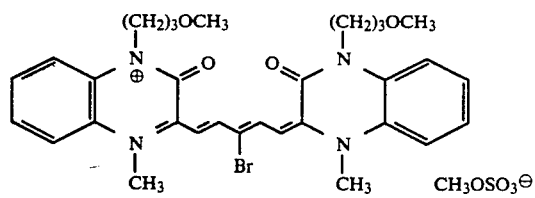

as a green, metallically bright solid. Yield: 2.5 g (30% of theory); melting point: 210°–212° C.; λmax=761 nm (in $CH_2Cl_2$).

EXAMPLE 3

2.6 g (8 mmol) of 4-n-dodecyl-2-methylquinoxal-3-one were mixed with 1.13 g (9 mmol) of dimethyl sulfate, and the mixture was heated at 150° C. for 15 minutes with stirring. After cooling back down to room temperature, 6 ml of acetic anhydride, 4 ml of pyridine and 0.9 g (4 mmol) of 3-methylmalondialdehydebisanil were added. The reaction mixture was stirred at room temperature for 1 hour and then combined with a solution of 1.2 g of sodium iodide in 10 ml of methanol. Following a further 10 minutes' stirring at room temperature, the precipitated dye of the formula

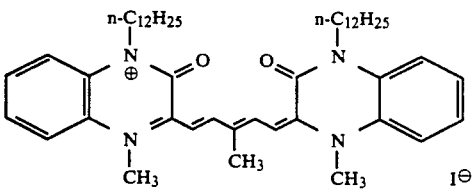

was filtered off with suction. Yield: 1.7 g (50% of theory); melting point: 135°–136° C.; λmax=756 nm (in $CH_2Cl_2$).

The dyes listed below were prepared similarly to Examples 1 to 3.

| Example No. | Dye | λmax [nm] | Solvent |
|---|---|---|---|
| 4 | ![structure] | 742 | $CH_2Cl_2$ |
| 5 | ![structure] | 742 | $CH_2Cl_2$ |

| Example No. | Dye | λmax [nm] | Solvent |
|---|---|---|---|
| 6 | 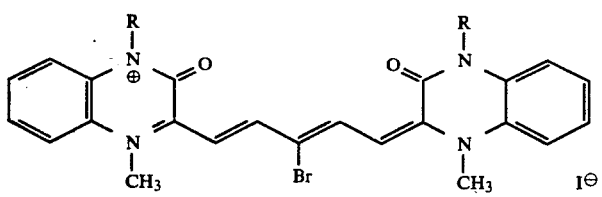 R = C₂H₄OC₂H₄OC₂H₅ | 752 | CH₂Cl₂ |
| 7 | 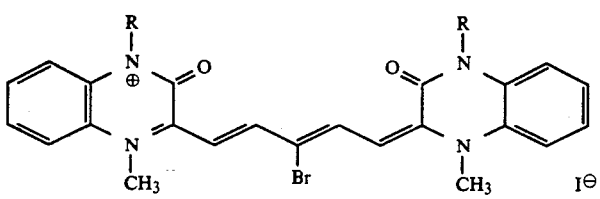 R = (CH₂)₃OCH₃ | 755 | CH₂Cl₂ |
| 8 | 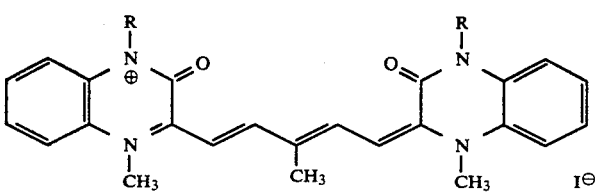 R = C₁₂H₂₅ | 756 | CH₂Cl₂ |
| 9 | 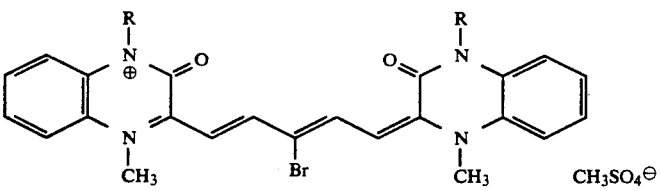 R = (CH₂)₃OCH₃ | 755 | CH₂Cl₂ |
| 10 | 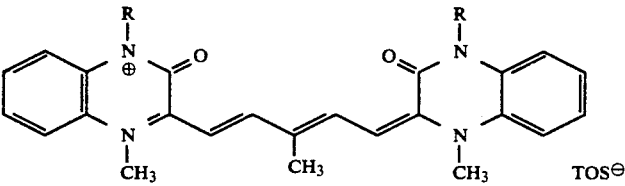 R = n-C₁₂H₂₅ | 756 | CH₂Cl₂ |
| 11 | 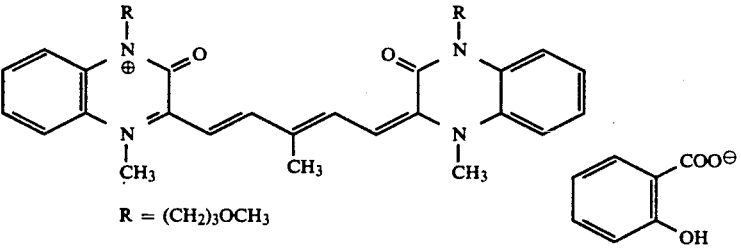 R = (CH₂)₃OCH₃ | 756 | CH₂Cl₂ |

-continued
| Example No. | Dye | λmax [nm] | Solvent |
|---|---|---|---|
| 12 | 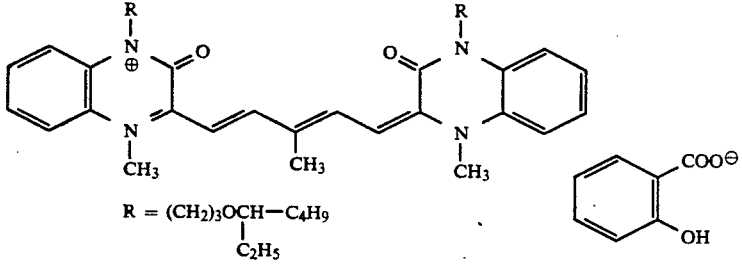 R = (CH$_2$)$_3$OCH—C$_4$H$_9$ / C$_2$H$_5$ | 756 | CH$_2$Cl$_2$ |
| 13 | 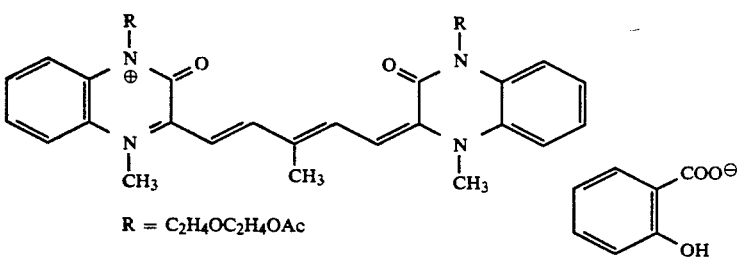 R = C$_2$H$_4$OC$_2$H$_4$OAc | 756 | CH$_2$Cl$_2$ |
| 14 | 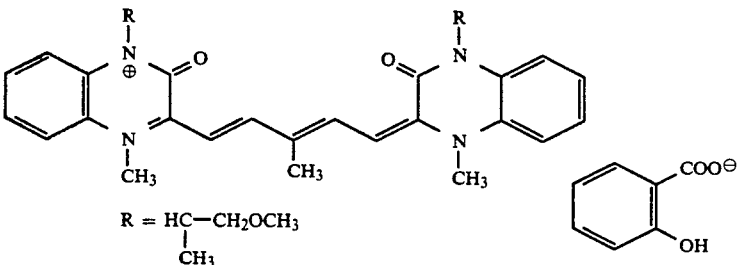 R = HC—CH$_2$OCH$_3$ / CH$_3$ | 755 | CH$_2$Cl$_2$ |
| 15 | 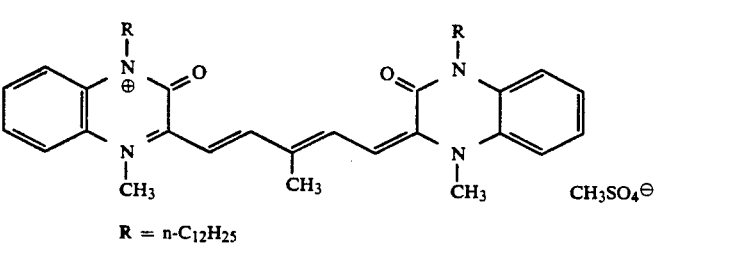 R = n-C$_{12}$H$_{25}$ | 761 | CH$_2$Cl$_2$ |
| 16 | 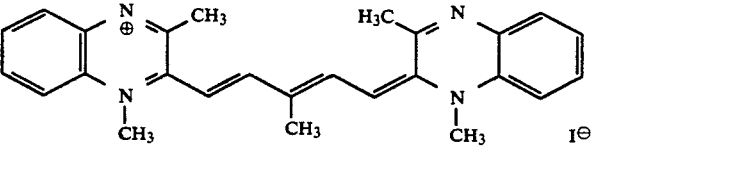 | 795 | CH$_2$Cl$_2$ |
| 17 | 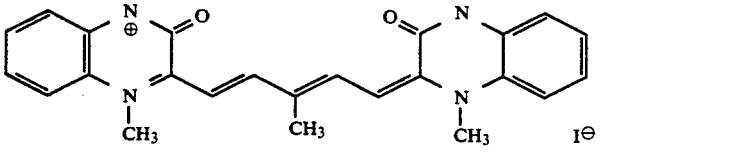 | 758 | CH$_2$Cl$_2$ |
| 18 | 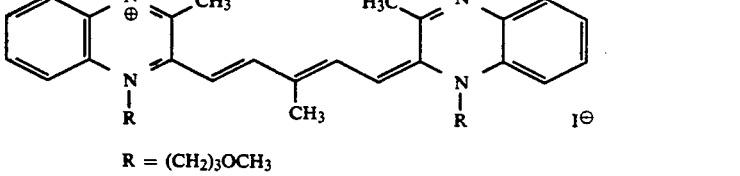 R = (CH$_2$)$_3$OCH$_3$ | 795 | CH$_2$Cl$_2$ |

| Example No. | Dye | λmax [nm] | Solvent |
|---|---|---|---|
| 19 | R = (CH₂)₃OCH₃ ; ClO₄⁻ | 795 | CH₂Cl₂ |
| 20 | R = (CH₂)₃OCH₂—CH(C₂H₅)—C₄H₉ ; I⁻ | 796 | CH₂Cl₂ |
| 21 | R = (CH₂)₃—N(morpholino) ; I⁻ | 795 | CH₂Cl₂ |
| 22 | R = CH₂—CH(C₂H₅)—C₄H₉ ; I⁻ | 795 | CH₂Cl₂ |
| 23 | R = CH₂CH₂CH₂OAc ; I⁻ | 798 | CH₂Cl₂ |

B) Preparation of Optical Recording Medium 0.134 g of a copolymer of methyl methacrylate/methacrylic acid (70:30) was dissolved in 0.808 g of diacetone alcohol and 4.48 g of ethanol, and 0.077 g of the dye of Example 1 was added. After stirring at room temperature for 1 hour, the mixture was filtered, and the filtrate was applied to a polymethyl methacrylate substrate by spin coating at 1800 rpm. The layer thus obtained was homogeneous and free of visible flaws. It had a wide absorption band; at 830 nm the absorbance was 0.35. The thickness of the layer was 70 nm. Using an AlGaAs laser mounted on a turntable, individual holes about 1μ in size were written into the active layer. The sensitivity of the layer was better than 1 nJ/hole. It was found that the dots could be read out with an excellent signal-to-noise ratio.

We claim:

1. A quinoxalinepentamethine dye of the formula I

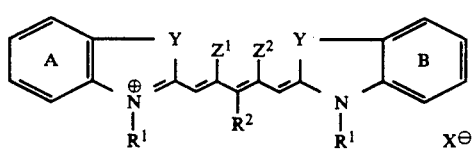

where

R¹ has identical or different meanings in each appearance, denoting in each case hydrogen, C₁-C₂₂-alkyl, which may be substituted and interrupted by one or more oxygen atoms, or substituted or unsubstituted C₅-C₇-cycloalkyl, R² hydrogen, chlorine, bromine or C₁-C₆-alkyl, Y has identical or different meanings in each appearance, denoting in each case a radical of the formula —N=C(CH$_3$)— or —N(R$^1$)—CO—, where R$^1$ is as defined above, Z$^1$ and Z$^2$ are each hydrogen or together are unsubstituted or C$_1$–C$_4$-alkyl-substituted C$_2$–C$_3$-alkylene, X$^\ominus$ is an anion and the rings A and B are identical to or different from each other and independently of each other may be substituted or benzofused.

2. A quinoxalinepentamethine dye as claimed in claim 1, wherein

R$^1$ is hydrogen or C$_1$–C$_{22}$-alkyl, C$_1$–C$_{22}$-bromoalkyl, C$_1$–C$_{12}$-hydroxylalkyl, C$_1$–C$_{12}$-methacryloyloxyalkyl, C$_1$–C$_{12}$-hydroxysulfonylalkyl, C$_1$–C$_6$-carboxyalkyl, or (C$_1$–C$_4$-alkoxycarbonyl)-C$_1$–C$_6$-alkyl, which may each be interrupted by from 1 to 3 oxygen atoms, R$^2$ is hydrogen, chlorine, bromine or C$_1$–C$_4$-alkyl, Z$^1$ and Z$^2$ are each hydrogen or together are unsubstituted or C$_1$–C$_4$-alkyl-substituted C$_2$–C$_3$-alkylene, and the rings A and B may each be amino-, chlorine-, bromine-, hydroxysulfonyl- or C$_1$–C$_6$-alkyl-substituted and/or benzofused.

3. A quinoxalinepentamethine dye as claimed in claim 1, wherein

R$^1$ is C$_1$–C$_{12}$-alkyl, C$_1$–C$_{12}$-bromoalkyl, C$_1$–C$_{12}$-hydroxysulfonylalkyl or (C$_1$–C$_4$-alkoxycarbonyl)-C$_1$–C$_6$-alkyl, which may each be interrupted by from 1 to 3 oxygen atoms, R$^2$ is hydrogen, chlorine, bromine or C$_1$–C$_3$-alkyl, Z$^1$ and Z$^2$ are each hydrogen, and the rings A and B are unsubstituted.

4. An optical recording medium containing a base and a dye-containing layer which is sensitive to laser light, wherein the dye is a quinoxalinepentamethine dye of the formula I

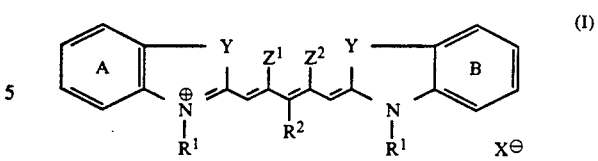

where

R$^1$ has identical or different meanings in each appearance, denoting in each case hydrogen C$_1$–C$_{22}$-alkyl, which may be substituted and interrupted by one or more oxygen atoms, or substituted or unsubstituted C$_5$–C$_7$-cycloalkyl, R$^2$ is hydrogen, chlorine, bromine or C$_1$–C$_6$-alkyl, Y has identical or different meanings in each appearance, denoting in each case a radical of the formula —N=C(CH$_3$)— or —N(R$^1$)—CO—, where R$^1$ is as defined above, Z$^1$ and Z$^2$ are each hydrogen or together are unsubstituted or C$_1$–C$_4$-alkyl-substituted C$_2$–C$_3$-alkylene, X$^\ominus$ is an anion and the rings A and B are identical to or different from each other and independently of each other may be substituted or benzofused.

5. An optical recording medium as claimed in claim 4, wherein

R$^1$ is hydrogen or C$_1$–C$_{22}$-alkyl, C$_1$–C$_{22}$-bromoalkyl, C$_1$–C$_{12}$-hydroxyalkyl, C$_1$–C$_{12}$-methacryloyloxyalkyl, C$_1$–C$_{12}$-hydroxysulfonylalkyl, C$_1$–C$_6$-carboxyalkyl or (C$_1$–C$_4$-alkoxycarbonyl)-C$_1$–C$_6$-alkyl, which may each be interrupted by from 1 to 3 oxygen atoms, R$^2$ is hydrogen, chlorine, bromine or C$_1$–C$_4$-alkyl, Z$^1$ and Z$^2$ are each hydrogen or together are unsubstituted or C$_1$–C$_4$-alkyl-substituted C$_2$–C$_3$-alkylene, and the rings A and B may each be amino-, chlorine-, bromine-, hydroxysulfonyl- or C$_1$–C$_6$-alkyl-substituted and/or benzofused.

6. An optical recording medium as claimed in claim 4, wherein

R$^1$ is C$_1$–C$_{12}$-alkyl, C$_1$–C$_{12}$-bromoalkyl, C$_1$–C$_{12}$-hydroxysulfonylalkyl or (C$_1$–C$_4$-alkoxycarbonyl)-C$_1$–C$_6$-alkyl, which may each be interrupted by from 1 to 3 oxygen atoms, R$^2$ is hydrogen, chlorine, bromine or C$_1$–C$_3$-alkyl, Z$^1$ and Z$^2$ are each hydrogen, and the rings A and B are identical and unsubstituted.

* * * * *